(12) United States Patent
Kemege (10) Patent No.: US 9,459,450 B2
(45) Date of Patent: Oct. 4, 2016

(54) SYSTEMS FOR AUTOMATICALLY REMOVING SPIDER WEBS AND OTHER DEBRIS FROM SURVEILLANCE CAMERA LENSES

(71) Applicant: AVAK Henderson Limited Partnership, Seattle, WA (US)

(72) Inventor: Vance Edward Kemege, Grandville, MI (US)

(73) Assignee: AVAK HENDERSON LIMITED PARTNERSHIP, Seattle, WA (US)

( * ) Notice: Subject to any disclaimer, the term of this patent is extended or adjusted under 35 U.S.C. 154(b) by 474 days.

(21) Appl. No.: 14/202,510

(22) Filed: Mar. 10, 2014

(65) Prior Publication Data

US 2014/0267715 A1 Sep. 18, 2014

Related U.S. Application Data

(60) Provisional application No. 61/777,911, filed on Mar. 12, 2013.

(51) Int. Cl.
*G02B 27/00* (2006.01)
*B08B 1/04* (2006.01)
*H04N 7/18* (2006.01)

(52) U.S. Cl.
CPC .............. *G02B 27/0006* (2013.01); *B08B 1/04* (2013.01); *H04N 7/18* (2013.01)

(58) Field of Classification Search
CPC ........ G02B 27/006; H04N 7/18; B08B 1/04; B08B 1/00; B60S 1/0497; B60S 1/0494; B60S 1/44
USPC ............... 15/250.246, 250.001, 250.22, 103; 359/507, 508; 134/6; 348/375
See application file for complete search history.

(56) References Cited

U.S. PATENT DOCUMENTS

| 2,100,055 | A | * | 11/1937 | Horton | B60S 1/44 15/250.19 |
|---|---|---|---|---|---|
| 2,540,407 | A | * | 2/1951 | Reed-Lethbridge | B60S 1/40 15/250.22 |
| 3,772,729 | A | * | 11/1973 | Evard | B60S 1/60 15/250.002 |
| 3,911,522 | A | * | 10/1975 | Wynn | B60S 1/44 15/250.22 |
| 5,208,938 | A | * | 5/1993 | Webb | B60S 1/185 15/250.001 |
| 6,550,090 | B1 | * | 4/2003 | Jesadanont | A47L 1/02 15/103 |
| 7,392,564 | B1 | | 7/2008 | Ferris | |
| 2008/0072393 | A1 | | 3/2008 | Tanaka | |

FOREIGN PATENT DOCUMENTS

| KR | 10-2003-0083544 A | 10/2003 |
|---|---|---|
| KR | 10-1006045 B1 | 1/2011 |
| KR | 10-2012-0126683 A | 11/2012 |

* cited by examiner

*Primary Examiner* — Gary Graham
(74) *Attorney, Agent, or Firm* — Olympic Patent Works PLLC (57) ABSTRACT

The current document is directed to automated, electromechanical methods and devices that clean dirt, moisture, and spider webs from the lenses of surveillance cameras. In one implementation, a camera-cleaning device comprises a cleaning unit, a freely rotating L-shaped hinge, a geared electric motor, a motor-control circuit for controlling the forward and backward motion of the device, and a time-control circuit for controlling the start, finish and run time of cleaning cycles. The cleaning unit includes a cleaning head and a propeller blade that spins to lift the cleaning unit up from a rest position to a cleaning position and subsequently clean the front of the camera lens. The pivotal L-shaped linkage enables the device to transition between the cleaning position and the rest position.

20 Claims, 13 Drawing Sheets

SYSTEMS FOR AUTOMATICALLY REMOVING SPIDER WEBS AND OTHER DEBRIS FROM SURVEILLANCE CAMERA LENSES

CROSS-REFERENCE TO RELATED APPLICATION

This application claims the benefit of Provisional Application No. 61/777,911, filed Mar. 12, 2013.

TECHNICAL FIELD

The current document is directed to surveillance systems, in particular, to systems for automatically removing spider webs and other debris from the lens surfaces of surveillance cameras.

BACKGROUND

Infra-red surveillance camera systems that send video signals to computer recording systems are used by the security industry to provide 24-hour surveillance of many buildings and facilities. Unfortunately, a major drawback of infra-red camera systems is that spiders nightly construct spider webs in front of the camera lens because their prey are attracted to the infra-red light. In addition to blocking the field of view, the motion of the webs continuously initiates video recording as a result of motion-detection recording-activation circuitry and software, which results in rapid exhaustion of the data-storage capacity of surveillance systems and a reduction in the number of days that surveillance systems can store video data before stored data is overwritten. Continuous activation of video recording increases the burden of reviewing the surveillance-camera recordings for specific incidents. Fog, driving rain, and condensation frequently obstruct camera lenses, and, when the moisture dries, leave stains on the lenses that further obstruct light gathering by the lenses. The lens of a surveillance camera needs to be cleaned regularly in order to ensure that clear images are captured by the surveillance camera and to increase the data-storage capacity of surveillance systems by preventing continuous activation of recording by spider web motion. Due to the generally high mounting position of surveillance cameras, conventional solutions include people climbing ladders with soft nylon brushes to manually clean camera lenses, or using a brush attached to an extension pole to regularly wipe the webs and dirt away. These processes are inconvenient, time-consuming, and expensive, particularly in the case of surveillance systems used for remote monitoring over the Internet. In addition, the manual cobweb removal may bump surveillance cameras out of position, resulting in additional labor and expenditures for re-aligning the cameras for proper viewing of a specific target area.

SUMMARY

The current document is directed to automated, electromechanical methods and devices that clean dirt, moisture, and spider webs from the lenses of surveillance cameras. In one implementation, a camera-cleaning device comprises a cleaning unit, a freely rotating L-shaped hinge, a geared electric motor, a motor-control circuit for controlling the forward and backward motion of the device, and a time-control circuit for controlling the start, finish and run time of cleaning cycles.

The cleaning unit includes a cleaning head and a propeller blade that spins to lift the cleaning unit up from a rest position to a cleaning position and subsequently clean the front of the camera lens. The pivotal L-shaped linkage enables the device to transition between the cleaning position and the rest position.

DETAILED DESCRIPTION

The current disclosure is directed to methods and devices for automatically removing spider webs and other debris from surveillance camera lenses without manually accessing the camera. In certain implementations, the device transitions between a cleaning position and a rest position outside of the field of view of the surveillance camera so that it does not obstruct the camera view when not in operation. The electromechanical methods and devices reduce the cost of manual cobweb removal, lens cleaning, and periodic maintenance. The current disclosure also helps increase the video-storage capacity by preventing video-recording activation by spider-web motion and facilitate review of recorded video by eliminating the need to review video recordings made as a result of spider-web movement.

Figure 1A:
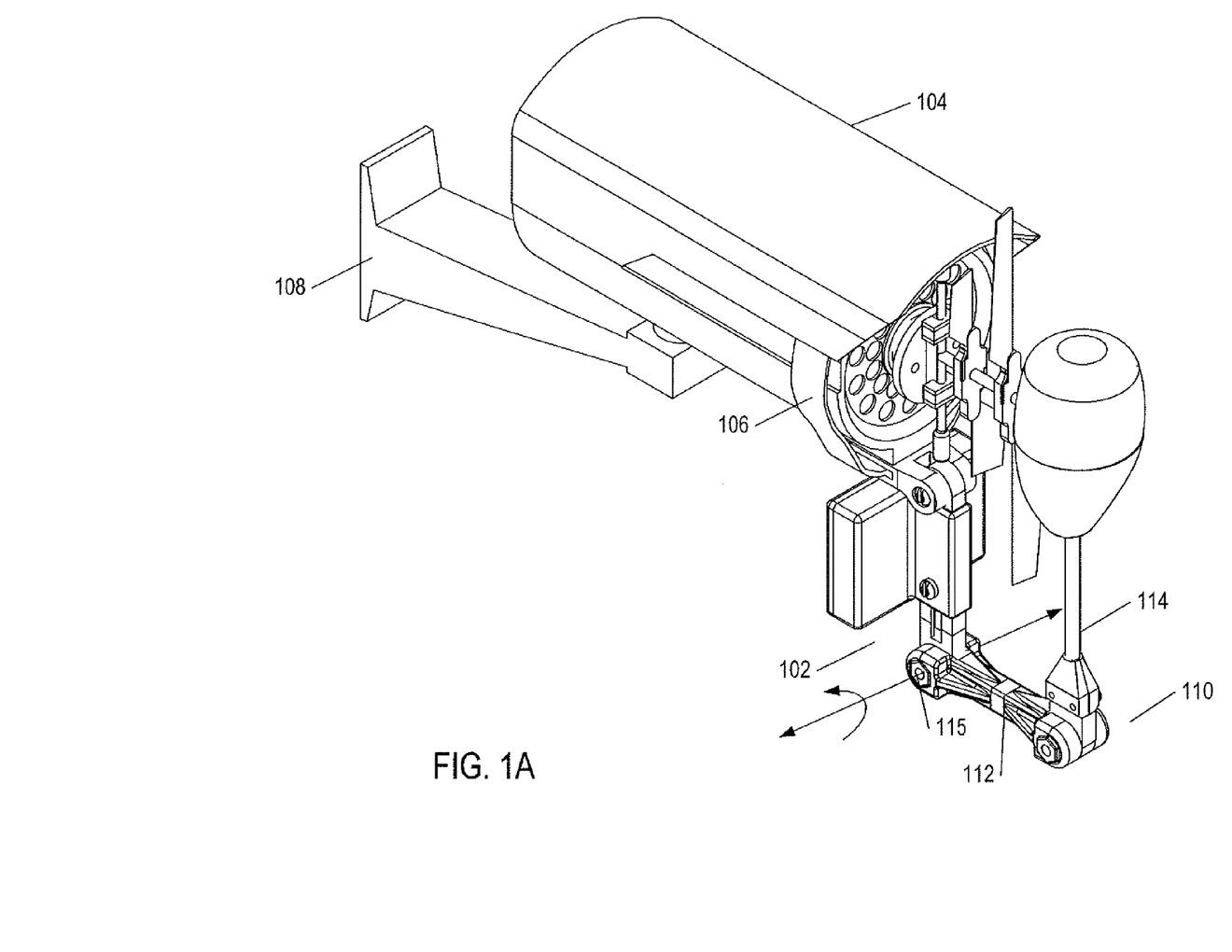
FIG. 1A shows a first implementation of a camera-cleaning device in a cleaning position.
Figure 1B:
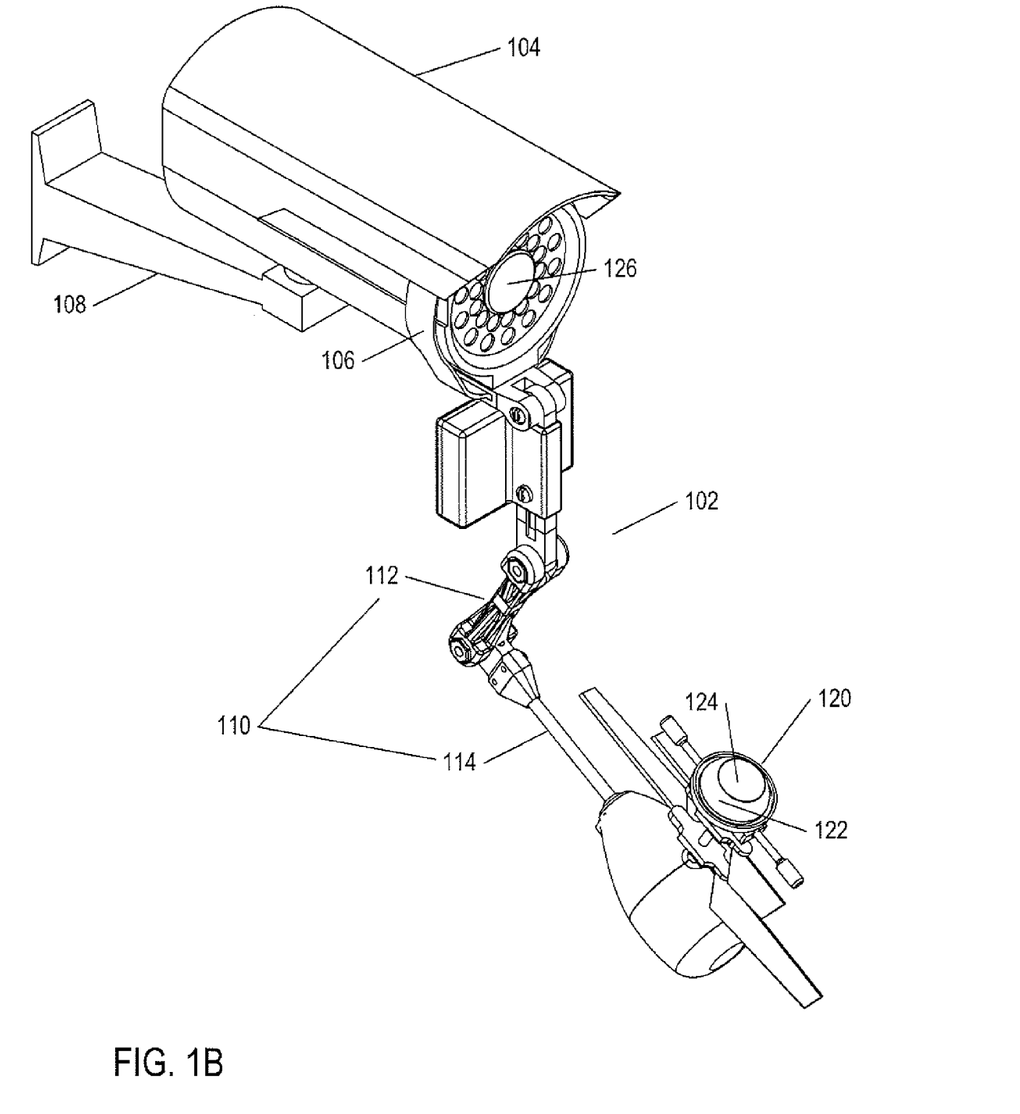
FIG. 1B shows the first implementation of the camera-cleaning device in a rest position.

FIG. 1A shows a first implementation of a camera-cleaning device in a cleaning position. FIG. 1B shows the first implementation of a camera-cleaning device in a rest position. In one implementation, a camera-cleaning device 102 is attached to the circumference of a camera housing 104 using a circumferential hoop 106 with an adjustable diameter. A mounting bracket 108 of the surveillance camera secures the camera and the cleaning device to a ceiling or a wall. Alternatively, the cleaning device 102 may have an independent mounting system. A L-shaped hinge 110 having a pivot arm 112 and a pivot extension 114 enables the cleaning device to pivot about a horizontal axis passing through an internal shaft 115 that connects the pivot arm 112 to a vertical arm to transition between the rest position shown in FIG. 1B and the cleaning position shown in FIG. 1A.

Referring to FIG. 1B, the camera-cleaning device consists of a cleaning head 120 that includes a truncated-cone-shaped, flat-topped dome 122 covered with a cleaning pad 124 made of microfiber or other soft materials. When the device is energized and in the cleaning position, it comes into direct contact with the lens 126 of the camera and sweeps over the entire surface of the camera lens. Many camera lenses have a plastic ring that surrounds the lens and protrudes from the glass surface. The truncated-cone-shaped dome allows the pad to contact the lens surface without being blocked from contact with the lens by the protruding plastic ring of the camera.

Figure 2A:
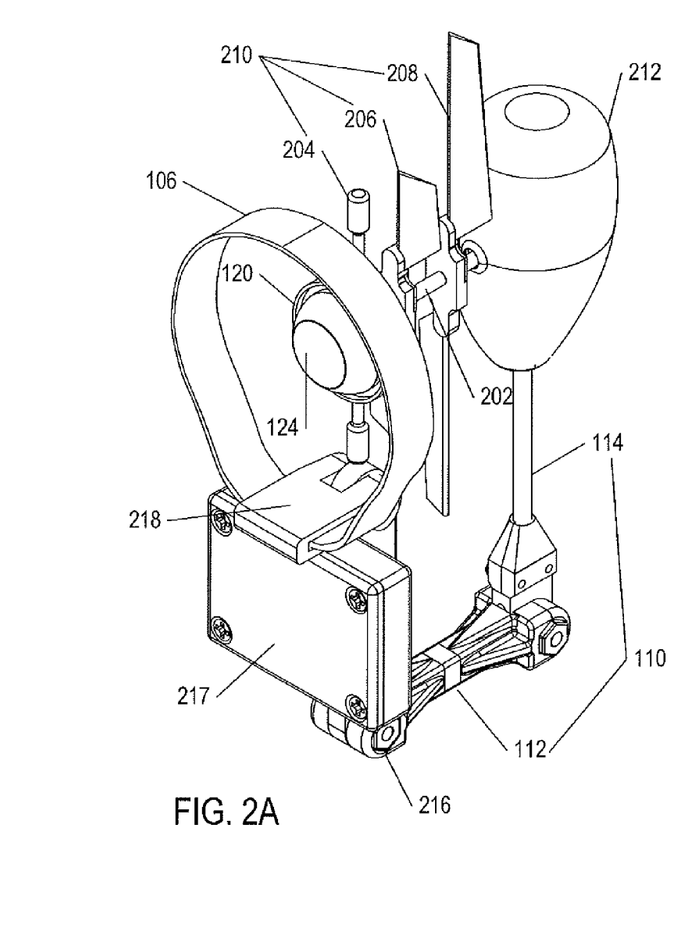
FIG. 2A-B show two side views of the first implementation of the camera-cleaning device in the cleaning position.
Figure 2B:
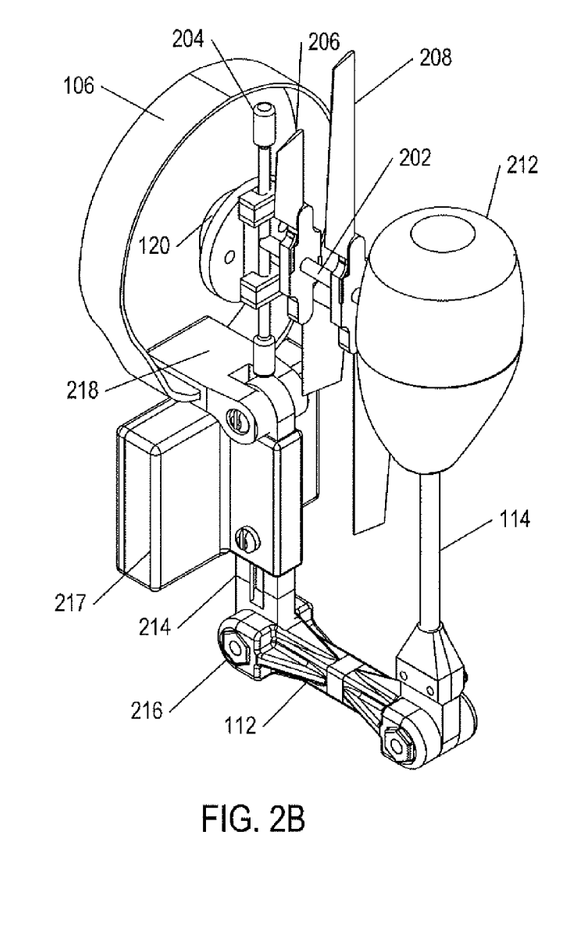

FIG. 2A-B show two side views of the first implementation of a camera-cleaning device in the cleaning position. The cleaning head 120 is pivotally attached to a rotating shaft 202 with a pivotal point of attachment which allows the pad to adjust for flat contact to the lens in the cleaning position. A wiper assembly 210, comprising protruding rod 204 and/or nylon fibers 206, and a propeller blade 208, is attached to the rotating shaft 202. The cleaning head 120 and the wiper assembly 210 together compose a cleaning unit that carries out lens cleaning. The protruding rods 204 and/or nylon fibers 206 in the wiper assembly 210 can be trimmed to the exact diameter of the camera housing during installation, so that, when spinning, they strike the spider webs and remove them from the entire front of the camera and from underneath the camera's sun shield. The nylon fibers may be replaced with nylon threads, soft nylon bristles, or any other flexible material trimmed to a proper length.

The propeller blades 208 are attached further down the rotating shaft 202 and perform three main functions when energized. First, the propeller blades convert rotary motion from an electric motor to provide a propulsive force. A relatively high revolutions-per-minute ("RPM") rotation of the propeller blades 208 provides a driving force to lift the entire cleaning unit around a pivot point from the lower rest position to the higher cleaning position in order to make contact with the lens 126. Secondly, once the cleaning pad 124 is in contact with the camera lens 126, the rotating propeller blades 208 can create a substantial low pressure area directly in front of the camera, causing all spider webs and other debris to be drawn outward away from the camera face directly into the path of the spinning rods 204 and fibers 206 for removal. And third, the blades 208 have a larger diameter than the camera housing, and thus remove any additional spider webs and debris that have not been removed by the spinning rod and fiber portion of the cleaning unit that fit under the camera's sun shield. The cleaning unit is driven by an electric-motor-powered gear assembly affixed at the end of the shaft 202, enclosed by a lightweight waterproof cowling 212 and sealed from water entry. The rotating shaft 202 is driven by the geared electric motor to spin the cleaning head 120 in a circular motion and to rotate the wiper assembly 210, including protruding rods 204, nylon fibers 206, and the propeller blades 208, along the shaft 202.

A hollow "L" shaped hinge 110 extends from the rotating shaft 202 and pivotally attaches to a hollow vertical arm 214 via screws or other fastening hardware. The hollow core allows for the passage of electrical communication wires. The joint where the L-shaped hinge 110 and the vertical arm 214 connects defines a pivot point 216 about which the cleaning unit, the gear assembly enclosed by the cowling, and the L-shaped hinge rotate, as a unit, when the device is energized, causing the unit to swing upward from the rest position below the camera into the cleaning position, as shown in FIGS. 1A-B. During a cleaning cycle, the properly aligned cleaning head 120 and the wiper assembly 210 rotate, as a unit, about the rotating shaft 202. The spinning microfiber pad 124 comes into contact with the camera lens 126 and wipes dirt, moisture, and other debris from the camera lens 126, while the spinning wiper assembly 210 draws cobwebs out away from camera housing and removes them. After running continuously for a minimum of 5 seconds, the unit is de-energized by a control circuit and gravity causes the unit to fall back down to the rest position, out of the field of view of the camera, as shown in FIG. 1B, so that the cleaning unit does not obstruct the view of the surveillance camera. At selected times, for example, once every 8 hours, the unit is re-energized and propelled about the pivot point 216 upward to the cleaning position to start another cleaning cycle. Both the resting time and the working time can be programmed into the control circuit.

The hollow vertical arm 214 extends from the pivot point 216 to the lower edge of the camera lens where the device is securely mounted to the camera housing. The height of the vertical arm 214 can be adjusted to ensure that the cleaning head 120 is horizontally aligned with the camera lens 126 when in the cleaning position. The vertical arm 214 is mounted to an electronics box enclosure 217 and further to a slotted foot 218. The electronics box enclosure 217 hosts a motor control circuit and is covered with a box lid secured with four screws. The motor control circuit consists of a group of devices that controls the starting and stopping of the electric motor and regulates forward and reverse rotations and the rotation speed. The circuit may have a DC voltage reducer, an H-bridge circuit to control the DC motor to run forwards and backwards, and a timing-control circuit that can be programmed for any combination of run time, start time, and finish time. The circuit may also have a temperature sensor to prevent the unit from operating below freezing temperatures, a self-healing fuse to prevent damage to the motor or the circuit, and status LED lights to show whether the unit is in a standby-with-power, running, or failure mode. The circuit may also have a light sensor for the device to detect and react to darkness so that the device can be activated on a nightly basis.

The slotted foot 218 securely mounts the device to the camera housing through a hoop 106 that is clamped around the circumference of the housing. Electrical wires run from the electric motor enclosed in the cowling 212 through the hollow "L" linkage 110 and the hollow vertical arm 214 up into the control circuit in the electronics box 217. Electrical wires may extend further from the electronics box 217 for approximately two feet to where electric power is supplied to the camera, not shown in the drawings. Optionally, the electric motor may be powered by a battery pack enclosed in the electronics box 217.

Figure 3A:
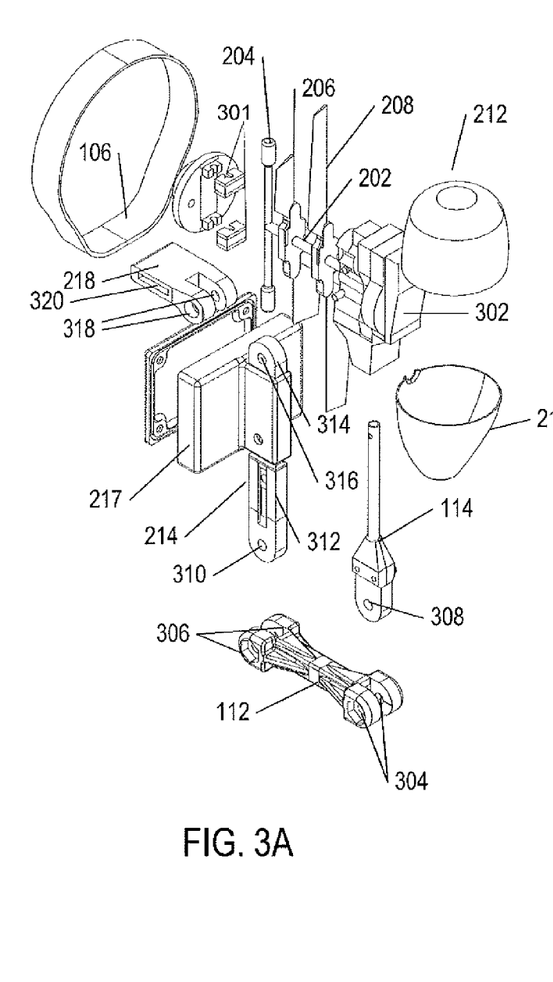
FIG. 3A-B show two exploded views of the first implementation of the camera-cleaning device.
Figure 3B:
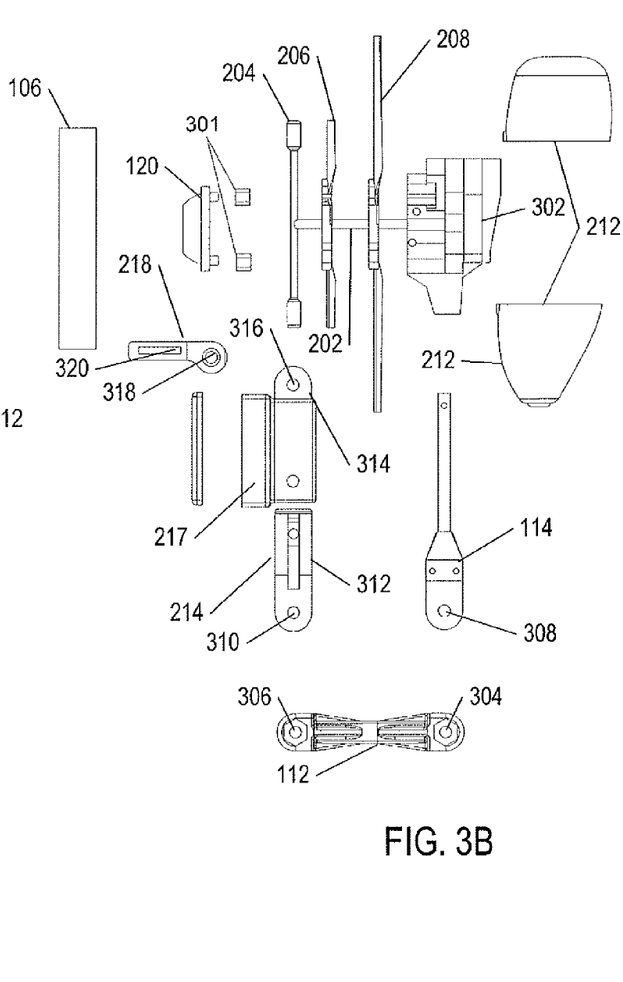

FIGS. 3 A-B show exploded views of the first implementation of a camera-cleaning device. Many of the numerals correspond to those elements previously described in FIG. 2 A-B. In detail, the microfiber cleaning head 120 is mounted to the rotating shaft 202 through the vertical protruding rod 204 with two rod clips 301. FIGS. 3A-B also illustrate the internal components of the gear assembly, including a lightweight direct current (DC) motor 302, affixed at the end of the rotating shaft 202 and enclosed by two halves of the cowling 212. The pivot arm 112 has an X-shaped structure, with two shaft holes 304, 306 through each end. The pivot arm 112 and the pivot extension 114 of the L-shaped hinge 110 are two separate parts. When assembled, the pivot arm 112 may be rigidly attached to the pivot extension 114 via a suitable fastener mounted through the shaft holes 304 of the pivot arm and a hole 308 in the pivot extension 114 to form the L shape, allowing no pivotal movement of the pivot arm with respect to the pivot extension. The L-shaped hinge 110 is pivotally attached to the vertical arm 214 via a shaft mounted through the shaft holes 306 of the pivot arm 112 and one corresponding hole 310 formed near the distal end of the vertical arm 214. The vertical arm 214 has a lower portion 312 and an upper portion 314. The lower portion 312 of the vertical arm 214 can be downwardly extended, and eventually detached from the upper portion 314. The upper portion 314 is mounted to the electronics box 217, and has a hole 316 formed near the apical end that is aligned with two shaft holes 318 formed in the slotted foot 218. Fastening hardware, for example, a nut and a bolt, may be mounted through the two shaft holes 318 of the slotted foot 218 and the hole 316 in the upper portion 314 of the vertical arm 214. A slot 320 is formed near the edge of the slotted foot 218 to receive the hoop 106 or another suitable fastening device so that the cleaning device can be securely mounted to the camera housing.

Upon installation of the camera-cleaning device, the camera is disconnected briefly to plug in a DC splitter, into which the plug for the cleaning device is plugged to provide DC power to the circuit in the box directly from the existing camera DC power supply. The control circuit may be programmed to wait for a period of time, for example five seconds, upon plugging the unit into DC power, then energizes and runs for five seconds before the device falls back down to the rest position. The process can be programmed and repeated as needed. When the unit does not contact the lens of the camera properly, the unit can be unplugged, re-adjusted manually, and then plugged back into the DC power supply to restart a cleaning cycle. Manual adjustment allows the person who installs the device to adjust the device as much as needed before leaving the device to run automatically. In the disclosed implementations, the device has no on or off switches or other adjusting dials that may be tampered with, allowing for easy installation and easy maintenance.

Experiments have been carried out to test various rotational velocities of the propeller blade 208 so that appropriate rotational velocities can be selected for the propeller to accomplish the three functions previously described. In some implementations, the propeller blade may have a single rotational velocity throughout a cleaning cycle. The rotational velocity may range from about 1000 RPM to about 2000 RPM, from about 2000 RPM to about 4000 RPM, from about 4000 RPM to about 6000 RPM, or higher. For example, a rotational velocity of 5000 RPM may be selected for a specific design of the cleaning head. Different rotational velocities may be selected for different designs and sizes of the cleaning head. The selected rotational velocity needs to be high enough so that the unit can be properly lifted up from the rest position when energized. The rotational velocity also needs to be low enough to cause the cleaning head to come up gently into the cleaning position where the microfiber pad is in contact with the camera lens, preventing damage to the camera. One feature of the cleaning device is the self-cleaning microfiber pad assembly. The rotational velocity of the propeller may be set to a value to spin dirt, moisture, and debris from the microfiber pad before the pad comes up into contact with the lens, allowing the microfiber pad assembly to clean itself.

In other implementations, the rotational velocity may be varied during a cleaning cycle in order to achieve different functions. For example, the rotational velocity of the propeller may start with a value high enough to spin debris and water from the cleaning pad, yet low enough not to lift the unit to the cleaning position. Once the cleaning pad is dry and cleaned, the rotational velocity of the propeller may be slowly increased to a value to gently lift the unit to the cleaning position. Finally, the rotational velocity of the propeller is increased to a highest value allowing the spinning microfiber pad to swipe the lens, and simultaneously drawing spider webs and other debris away from the camera face for removal by creating a substantial low pressure in front of the camera.

Figure 4:
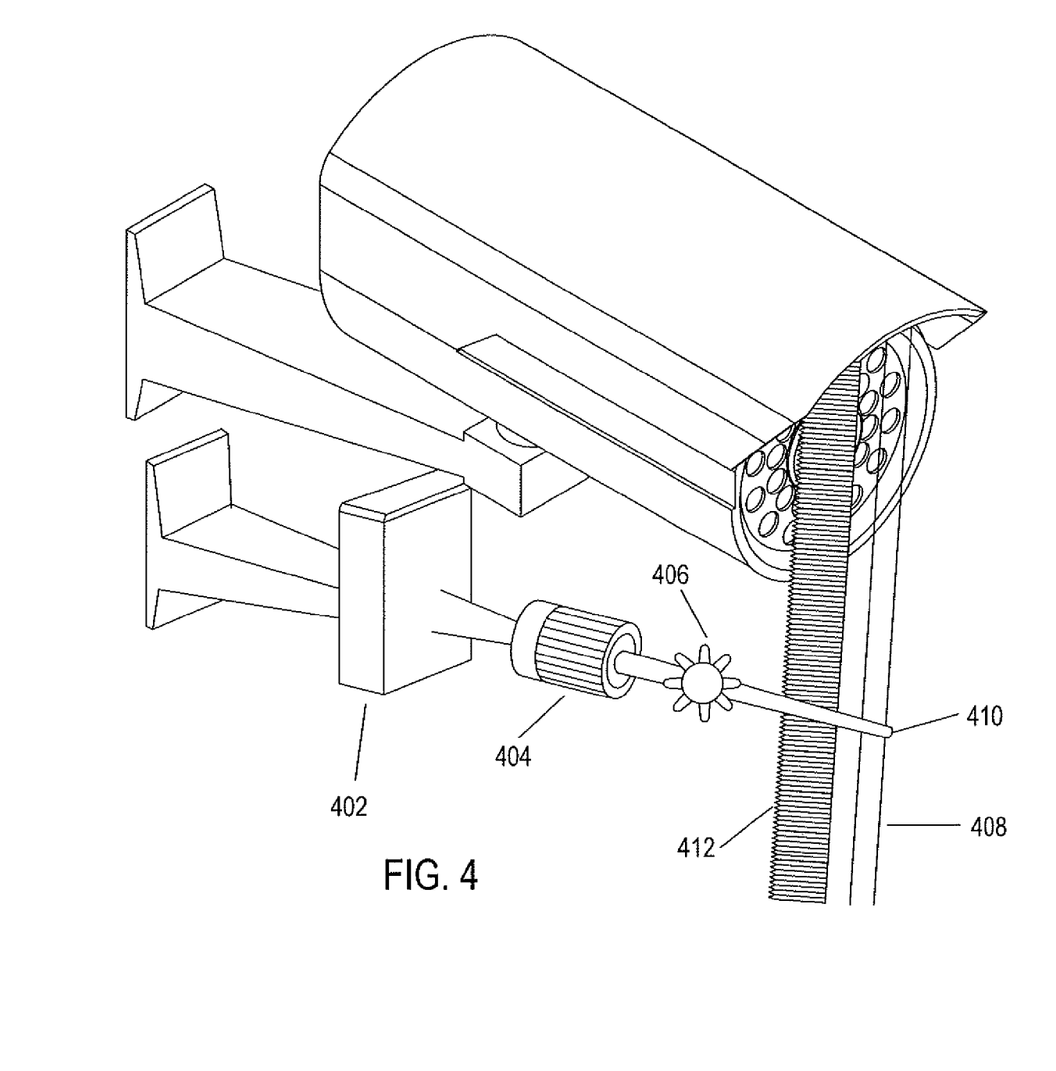
FIG. 4 illustrates a second implementation of the camera-cleaning device.

FIG. 4 illustrates a second implementation of the camera-cleaning device. In this implementation, the cleaning device comprises four components: (1) an electronics box enclosure 402, similar to the electronics box of the first implementation shown in FIG. 2A-B; (2) an electric motor 404; (3) a gear assembly 406 that may be covered by a cowling; and (4) a cleaning unit 408 attached to a rotating shaft 410. The cleaning unit 408 may consist of nylon threads 412, soft brushes, nylon bristles, or other flexible material, which can be trimmed to the exact diameter of the camera housing before installation. The rotating shaft 410 is driven by the geared electric motor to spin the cleaning unit 408 in a circular motion along the rotating shaft. When spinning, the cleaning unit 408 can strike the spider webs and remove them from the front of the camera and from underneath a sun shield mounted to the camera. The motor 404 may be powered by a battery pack enclosed in the electronics box 402 or may have an optional power cord connecting with the existing camera DC power supply. The device may be placed underneath the surveillance camera, as shown in FIG. 4, or may be placed in any proper orientation to the camera. The device may be attached directly to the camera housing suitable fastening solutions, such as the one shown in FIG. 1A-B. Alternatively, the device maybe independently mounted to the same surface, as shown in FIG. 4, or to a different surface than the surface to which the camera is attached to.

Figure 5:
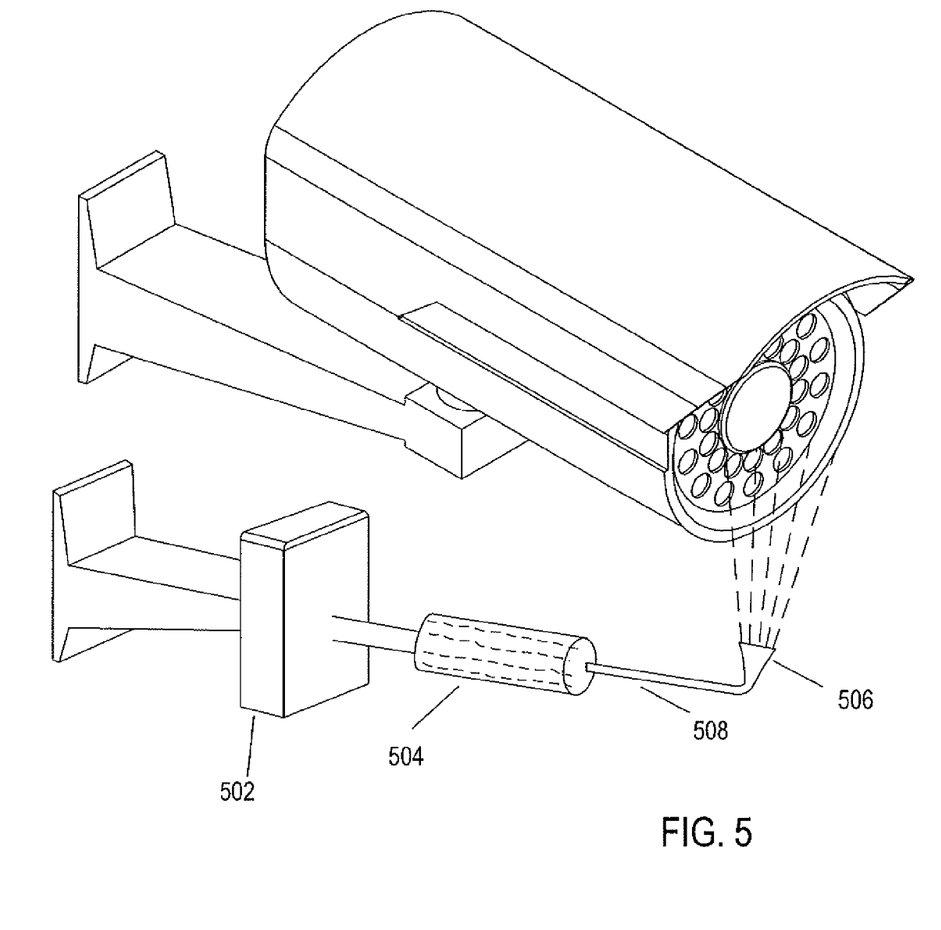
FIG. 5 illustrates a third implementation of the camera-cleaning device.

FIG. 5 illustrates a third implementation of the camera-cleaning device. In this implementation, the cleaning device comprises three components: (1) an electronics box enclosure 502, similar to the electronics box of the first implementation shown in FIG. 2A-B; (2) an electronically actuated air or liquid canister 504; and (3) a spray nozzle 506. The liquid canister 504 may be filled with cleaning fluid and/or spider or bug repellant. A supply conduit 508 connects the spray nozzle 506 to the canister 504 to enable air or liquid solution to be delivered by command. The device is activated intermittently to spray air or cleaning fluid over the entire surface of the dome, removing all cobwebs and dirt away from the camera lens to restore a clear view for the video camera. Air or cleaning liquid may be dispensed under relatively high pressure through the conduit. After a few seconds, the device is powered down, by the timing-control circuit enclosed in the electronics box, and the nozzle stops spraying.

Figure 6:
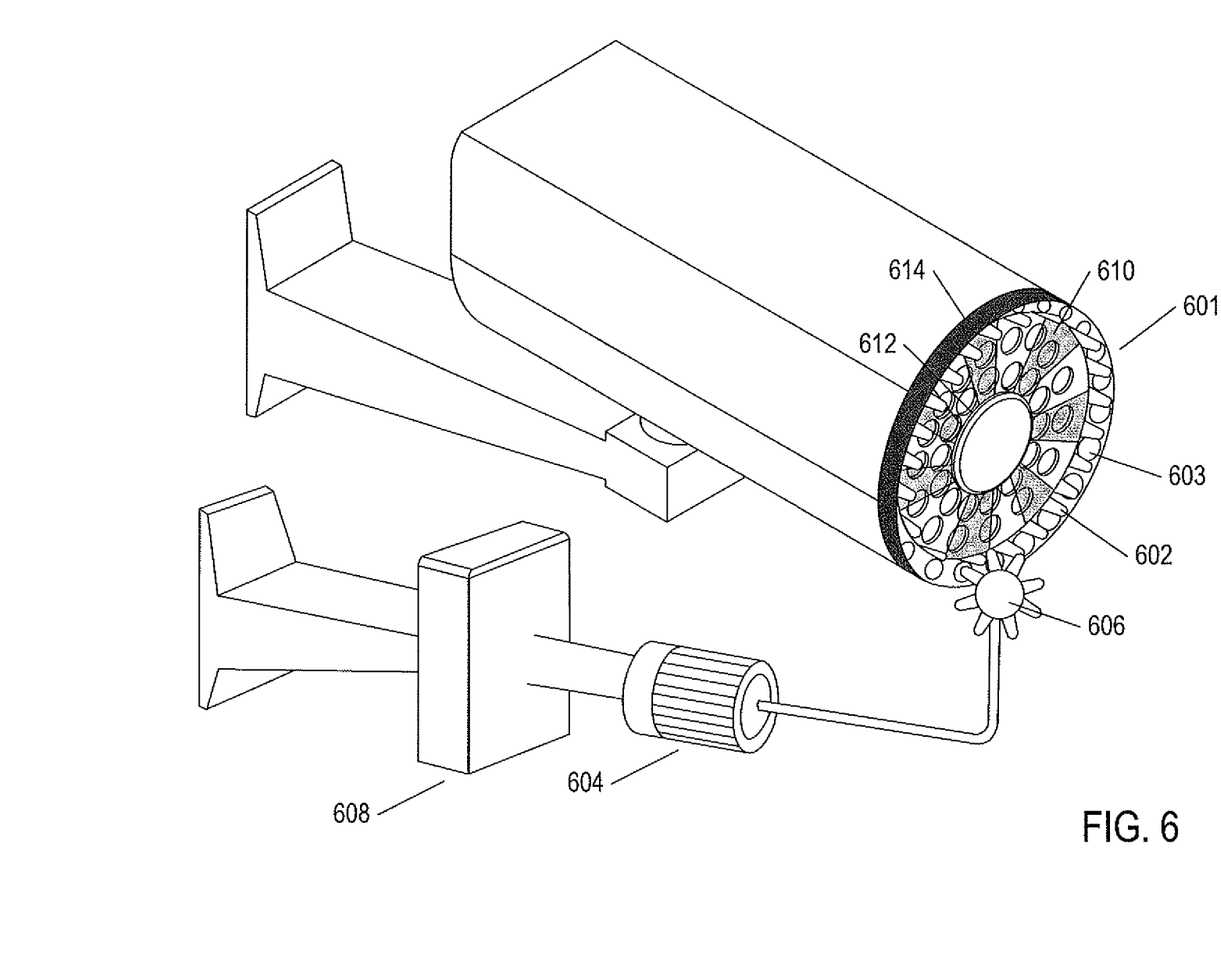
FIG. 6 illustrates a fourth implementation of the camera-cleaning device.

FIG. 6 illustrates a fourth implementation of the camera-cleaning device. In this implementation, the cleaning device comprises four components: (1) a circular rotating assembly 601 having a first rotating gear 602 attached to a rolling bearing 603; (2) an electric motor 604; (3) a second rotating gear 606 engaged with the first rotating gear 602 and powered by the motor 604 to spin the circular assembly 602; and (4) an electronics box enclosure 608, similar to the electronics box of the first implementation shown in FIG. 2A-B. The rotating assembly 601 features small transparent, radially-distributed blades 610 attached to a hub 612. The rotating assembly 601 may be rotated by the gears when the device is energized, or freely spun in the wind. The first rotating gear 602 may be a crown gear with cogs projecting orthogonally to the plane of the rotating wheel. The inner circumference of the first rotating gear 602 is attached to the radially-distributed blades 610, while the outer circumference is attached to the rolling bearing 603 that is further attached to a fixed mounting ring 614 that is clamped around the circumference of the camera housing. The blades 610 rotate about an axis which is generally coaxial with a central, outward-projecting axis of the camera lens, sweeping over the entire area in front of the camera lens to remove the spider webs. The motor 604 may be powered by a battery pack enclosed in the electronics box 608, or may have an optional power cord (not shown) connecting with the existing camera DC power supply.

Figure 7:
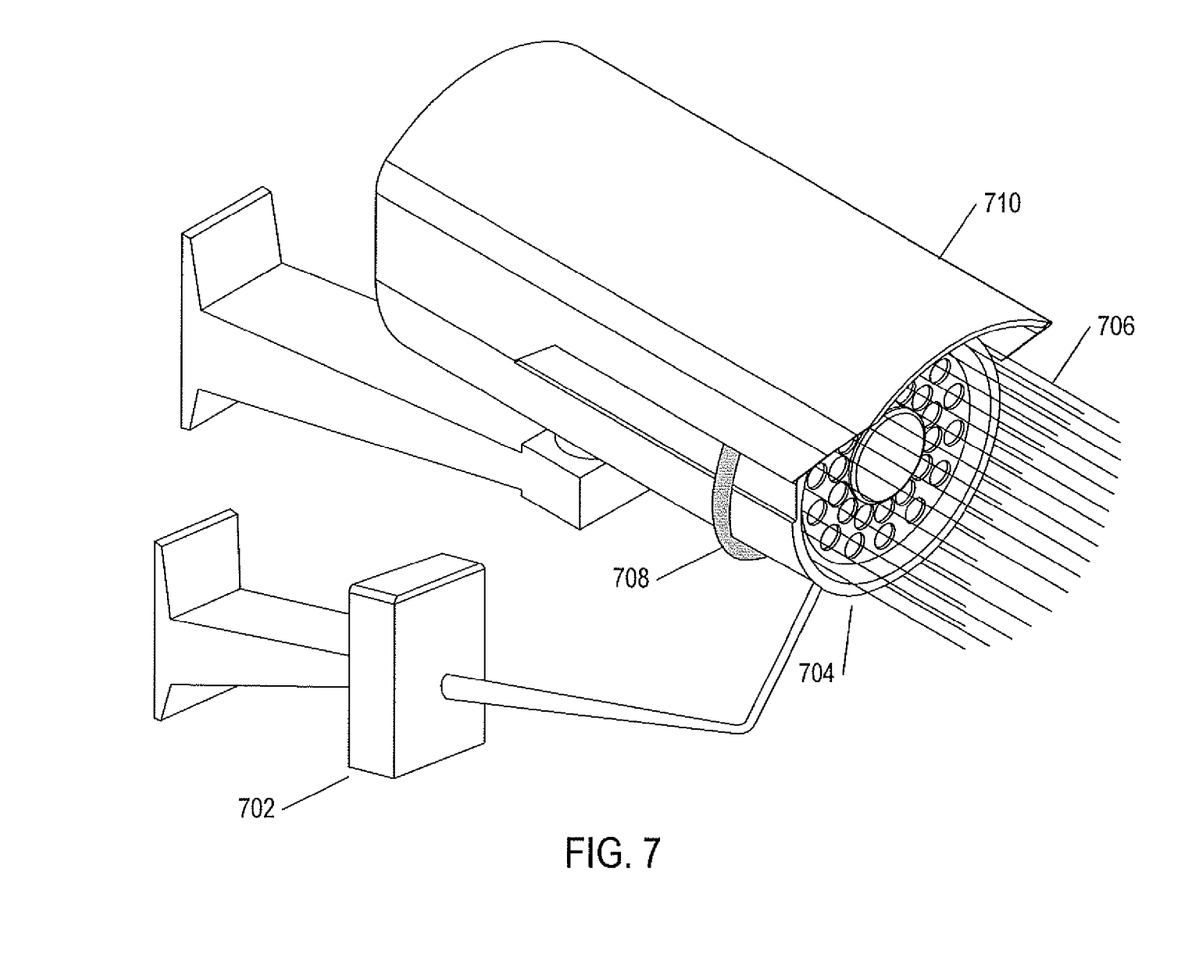
FIG. 7 illustrates a fifth implementation of the camera-cleaning device.

FIG. 7 illustrate a fifth implementation of the camera-cleaning device. In this implementation, the cleaning device comprises two components: (1) an electronics box enclosure 702, similar to the electronics box of the first implementation shown in FIG. 2A-B; and (2) a clean unit 704 consisting of an electrical wire assembly 706. The device may have an optional power cord connecting with the existing camera DC power supply. The electrical wire assembly 706 may have a cylinder shape, consisting of a series of elongated thin wires protruding from a hoop 708 that is clamped around the circumference of the camera housing. The wires are parallel and alternated with one another so that adjacent wires have opposite polarity. The wires are closely spaced about ⅛ inch apart, or at about the size of a spider or a typical insect. The wires become electrically charged when the device is energized. By touching two adjacent wires, the spiders and other insects that are attracted towards the camera lens are electrocuted. The voltage is high enough to kill insects but safe to humans. The device may be placed underneath the camera sunshield 710, as shown in FIG. 7, or may be placed in any proper orientation to the camera.

Figure 8:
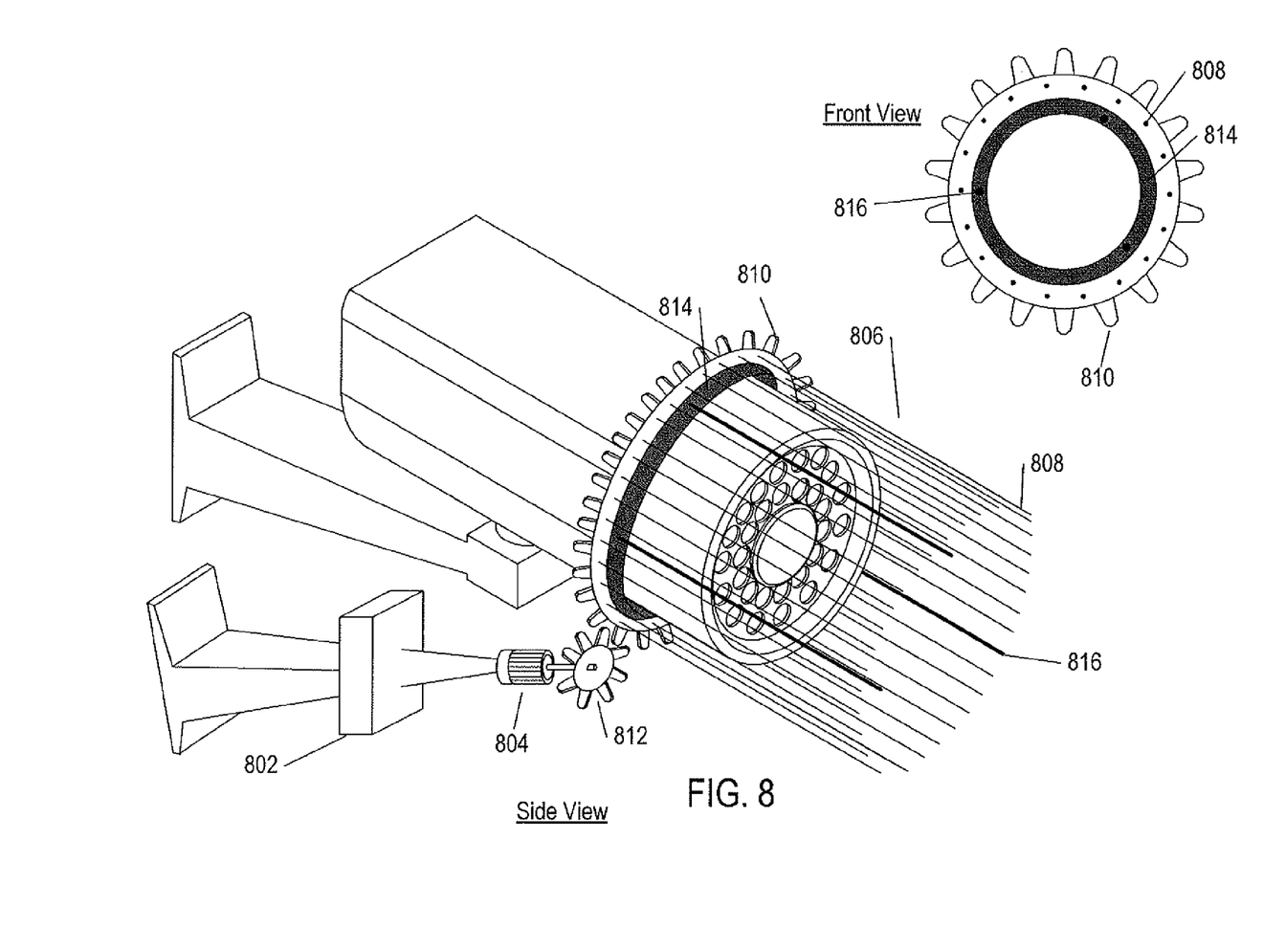
FIG. 8 illustrates a sixth implementation of the camera-cleaning device.

FIG. 8 illustrates a sixth implementation of the camera-cleaning device. In this implementation, the cleaning device comprises four components: (1) an electronics box enclosure 802, similar to the electronics box of the first implementation shown in FIG. 2A-B; (2) an electric motor 804; (3) a wire assembly 806 having a series of thin wire strands 808 extending from a first rotating gear 810 and parallel to the camera housing; and (4) a second rotating gear 812 engaged with the first rotating gear 810 and driven by the electric motor 804. The inner circumference of the first rotating gear 810 is further attached to a fixed mounting ring 814 that is clamped around the circumference of the camera housing. The wire assembly 806 also consists of one or more stationary wires 816 that are attached to the fixed ring 814, parallel to the rotating wires 808. When the device is energized, the first rotating gear 810, together with the rotating wires 808, spins around the fixed ring 814, drawing spider webs outward towards the wires, where the spider webs are then caught and removed by the stationary wires 816 as they pass through. The motor 804 may be powered by a battery pack enclosed in the electronics box 802, or may have an optional power cord (not shown) connecting with the existing camera DC power supply.

Figure 9:
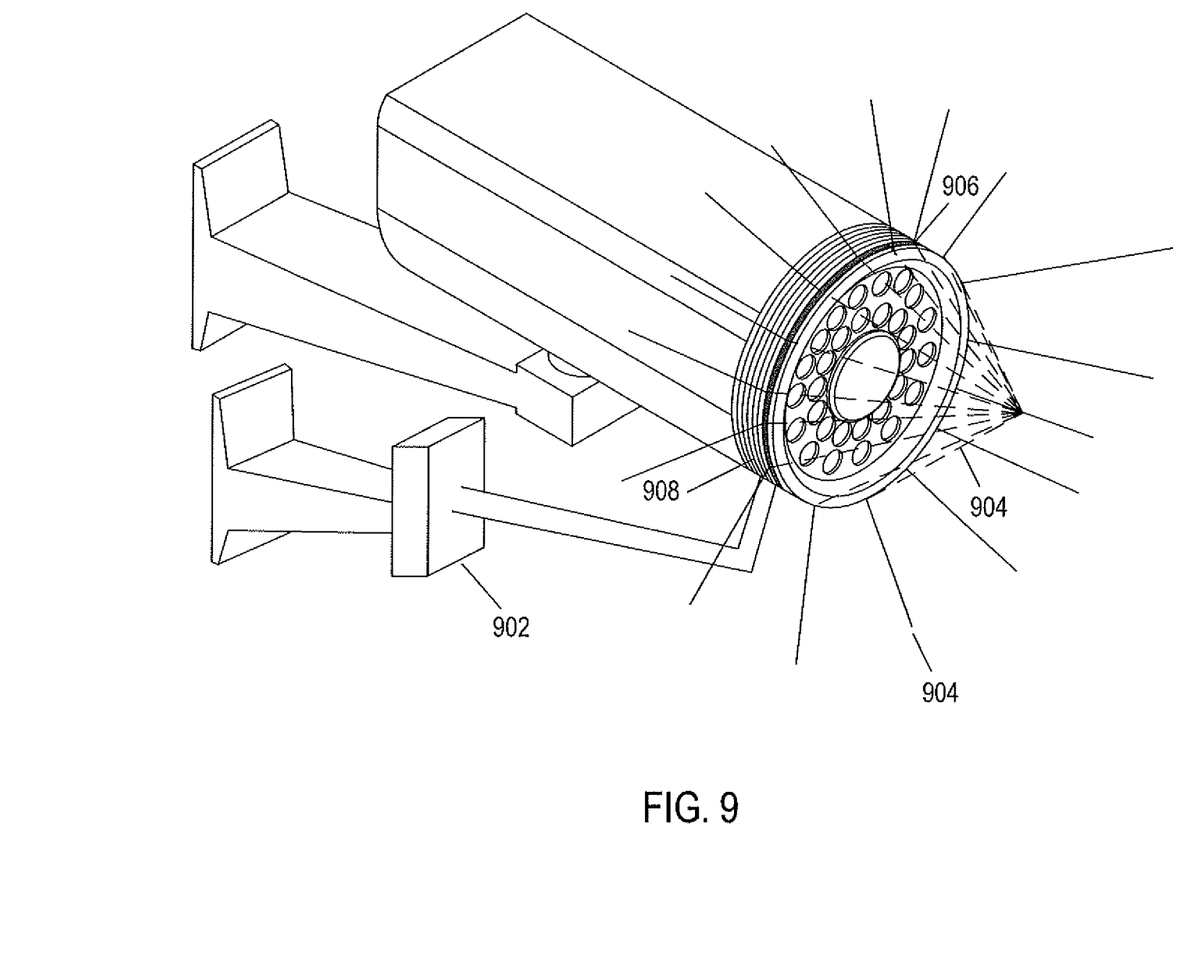
FIG. 9 illustrates a seventh implementation of the camera-cleaning device.

FIG. 9 illustrates a seventh implementation of the camera-cleaning device. In this implementation, the cleaning device comprises three components: (1) an electronics box enclosure 902, similar to the electronics box of the first implementation shown in FIG. 2A-B; (2) a group of radially extending wires 904 pivotally attached to a mounting ring 906 secured to the camera housing; and (3) an electromagnet 908 consisting of a coil of insulated wires wrapped around the mounting ring. The radial wires 904 may be pivotally attached to the mounting ring 906 via a hinge or a spring. When the device is energized, the magnetic field created by the electric current flow exerts a force to pull or push the base of the radial wires 904 about its pivot point, causing the distal end of the wires 904 to meet in front of the camera lens. After a few seconds, the power to the device is terminated, and the wires 904 pivot back to the initial open position, lifting spider webs out of the camera view.

Figure 10:
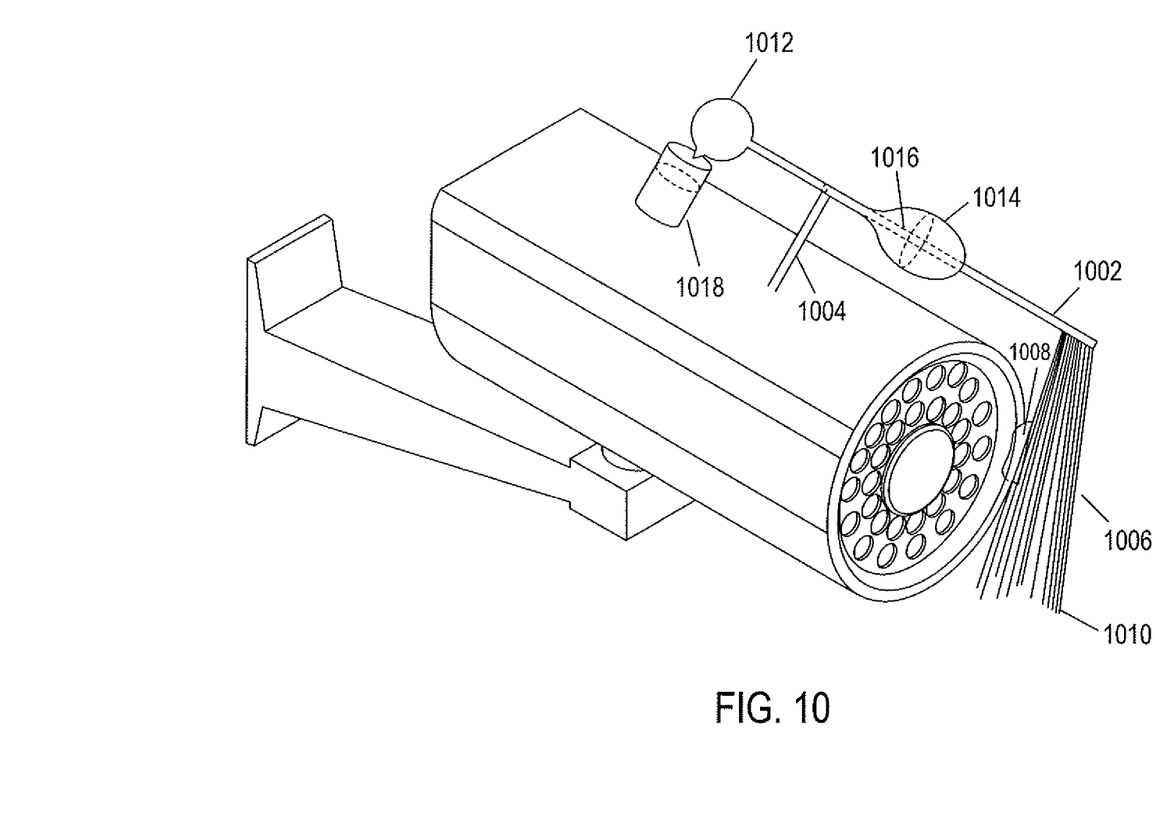
FIG. 10 illustrates an eighth implementation of the camera-cleaning device attached to a dome surveillance camera.

FIG. 10 illustrates an eighth implementation of the camera-cleaning device. In this implementation, the cleaning device comprises two components: (1) a self-oscillating mechanical device 1002 pivotally attached to a support 1004 fixed to the camera housing; and (2) a cleaning unit 1006 attached to one end of the self-oscillating device. The cleaning unit 1006 may consist of a microfiber covered cleaning head 1008, nylon threads 1010, soft brushes, nylon bristle, or other flexible material. The self-oscillating device 1002 consists of a ball-shaped head 1012 and a lower body 1014 filled with liquid, such as methylene chloride. The head 1012 and the lower body 1014 are hollow glass chambers connected by a glass tube 1016. A container 1018 filled with water may be placed underneath the ball-shaped head. The head 1012 of the self-oscillating device may be coated with felt to absorb water with every downward swing. Water evaporation from the head reduces the temperature of the head 1012, slightly lowering the pressure in the head. As the pressure changes in the head, the wire assembly 1006 swings downwards in front of the camera lens, removing cobwebs from the entire front of the camera. After the pressure reverses in the lower body, the assembly of the wires 1006 swings back out of the camera view, lifting cobwebs away.

Figure 11A:
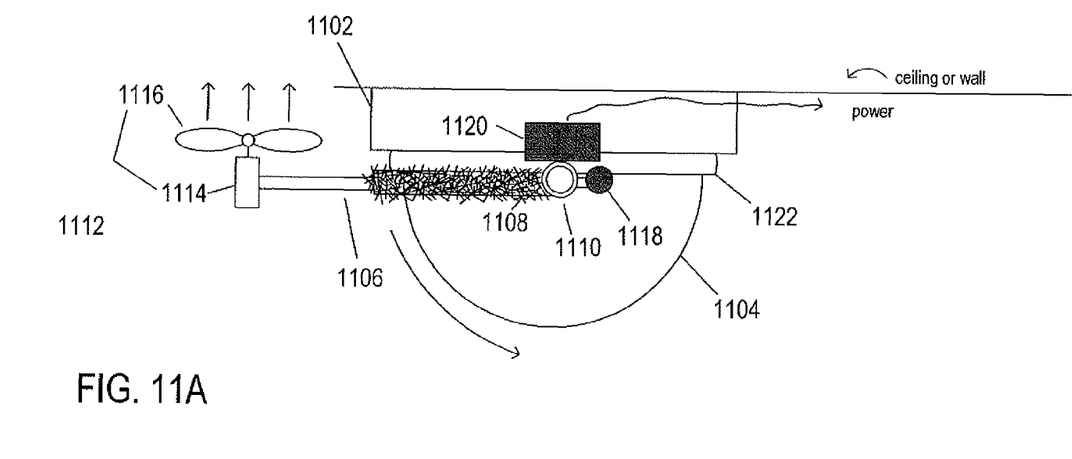
FIGS. 11A-C illustrate an alternative implementation of the camera-cleaning device attached to a dome surveillance camera.
Figure 11B:
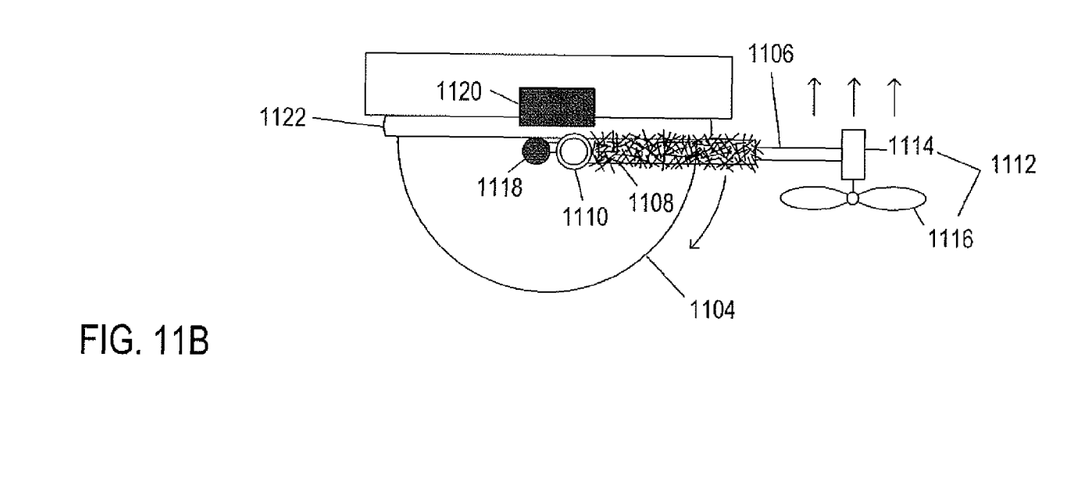
Figure 11C:
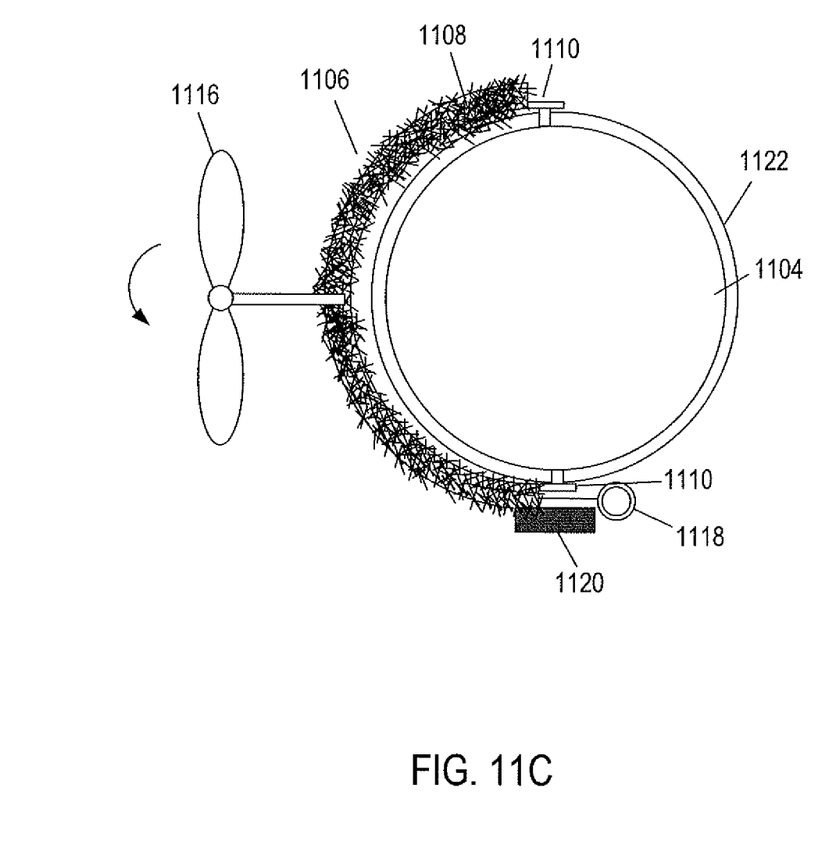

FIGS. 11A-C illustrate an alternative implementation of the camera-cleaning device attached to a dome surveillance camera. FIGS. 11A-B show two side views of the cleaning device attached to the dome surveillance camera and FIG. 11C shows a top view of the cleaning device attached to the dome surveillance camera. A dome surveillance camera, as shown in FIGS. 11A-B, generally comprises a camera housing 1102, a transparent hemispherical dome 1104, and a camera module located in the center of the dome that is not shown for clarity. The cleaning device 1106 consists of a cleaning head 1108, covered with microfiber, which closely encircles the camera dome 1104 so that, when the device 1106 is in operation, the microfiber is in contact with the dome. Each end of the cleaning head is pivotally mounted to bearings 1110 that enable the curved cleaning head to pivot along an axis through the center of the dome, when energized, to sweep over the entire dome surface at 180-degree angle.

A downwardly protruding driver assembly 1112 comprising a motor 1114 and a propeller 1116 is attached to the cleaning head 1108 at the midpoint. A small counterweight 1118 is affixed to the other side of the pivot point opposite of the cleaning head 1108. The counterweight 1118 has a weight equivalent to the weight of the cleaning head 1108 and the driver assembly 1112 to balance the unit so that the unit can be kept in a horizontal position outside the field of view of the camera when the device is not in operation, as shown in FIGS. 11A-B. The device also comprises an electronics box enclosure 1120, similar to the electronics box of the first implementation shown in FIG. 2A-B. The motor 1114 may be powered by a battery pack enclosed in the electronics box, or may have an optional power cord connecting with the existing camera DC power supply. When the device is energized, the spinning propeller blade 1116 provides a propulsive force to push the cleaning head 1108 around two pivot points, rotating it anticlockwise from position 1 on one side of the dome, shown in FIG. 11A, to position 2 on the other side, shown in FIG. 11B, where the counterweight 1118 holds the unit in place. The device is intermittently re-energized, and the reverse spinning of the propeller blade 1116 drives the cleaning unit 1108 to rotate clockwise across the entire surface and return back to position 1 in FIG. 11A. The cleaning device may be mounted to the camera base using a strap lock 1122 or a hoop that is clamped around the circumference of the housing.

Although the present disclosure has been described in terms of particular implementations, it is not intended that the disclosure be limited to these implementations. Modifications will be apparent to those skilled in the art. For example, as disclosed above, the shape, dimension, and arrangement of parts of the cleaning device may vary depending upon the configuration and dimension of surveillance camera systems. The run time and rest time of the device can be controlled by the control circuit in any of the implementations. The device may be mounted directly to the camera housing suitable fastening solutions and placed underneath or above the camera sunshield. Alternatively, the device may have a separate mounting system. The cleaning device disclosed in the current document may be used for cleaning any camera systems, including video cameras, photo cameras, and any other suitable optical instruments.

The foregoing description, for purposes of explanation, used specific nomenclature to provide a thorough understanding of the invention. However, it will be apparent to one skilled in the art that the specific details are not required in order to practice the invention. The foregoing descriptions of specific implementations of the present invention are presented for purpose of illustration and description. They are not intended to be exhaustive or to limit the invention to the precise forms disclosed. Many modifications and variations are possible in view of the above teachings. The implementations are shown and described in order to best explain the principles of the disclosure and its practical applications, to thereby enable others skilled in the art to best utilize the invention and various implementations with various modifications as are suited to the particular use contemplated. It is intended that the scope of the invention be defined by the following claims and their equivalents.

The invention claimed is:

1. An automatic camera-cleaning device that removes spider webs and other debris from a front of a surveillance camera, the automatic camera-cleaning device comprising:
    an electric motor;
    an electronics box having a motor control circuit for controlling the electric motor and a timing-control circuit for controlling a start time, finish time, and run time of the cleaning device;
    a vertical arm mounted to the electronics box;
    a freely rotating L-shaped hinge that is pivotally attached to the vertical arm and enables the cleaning device to transition between a cleaning position and a rest position in which the cleaning device is outside of the field of view of the camera; and
    a rotatable cleaning unit having a cleaning head and a propeller blade that spins, when powered by the motor, to lift the unit up to the cleaning position.

2. The automatic camera-cleaning device of claim 1, wherein the cleaning head has a truncated-cone shape.

3. The automatic camera-cleaning device of claim 1, wherein the cleaning head is covered with a cleaning pad.

4. The automatic camera-cleaning device of claim 3, wherein the cleaning head can clean itself by spinning dirt, moisture, and debris from the cleaning pad before the pad comes into contact with the lens.

5. The automatic camera-cleaning device of claim 3, wherein the cleaning pad is made of microfiber.

6. The automatic camera-cleaning device of claim 1, wherein, when the propeller blade spins, a low-pressure area is created in front of the camera, drawing spider webs and other debris away from the camera face for removal.

7. The automatic camera-cleaning device of claim 1, wherein the cleaning unit further comprises one or more components selected from among:
    protruding rods; and
    nylon fibers.

8. The automatic camera-cleaning device of claim 1, wherein the propeller blade spins at a single rotational velocity.

9. The automatic camera-cleaning device of claim 8, wherein the rotational velocity is one of:
    1000 RPM to 2000 RPM;
    2000 RPM to 4000 RPM; and
    4000 RPM to 6000 RPM.

10. The automatic camera-cleaning device of claim 1, wherein the propeller blade can spin at two or more different rotational velocities.

11. The automatic camera-cleaning device of claim 10, wherein the rotational velocity of the propeller can be set to a first value so that the cleaning unit can be properly lifted up from the rest position when energized.

12. The automatic camera-cleaning device of claim 11, wherein the rotational velocity of the propeller can be set to a second value, after lifting from the rest position, to cause the cleaning head to come up gently into the cleaning position.

13. The automatic camera-cleaning device of claim 1, wherein a height of the vertical arm is adjustable.

14. The automatic camera-cleaning device of claim 1, wherein the L-shaped hinge comprises a pivot arm and a pivot extension, which are rigidly interconnected.

15. The automatic camera-cleaning device of claim 14, wherein the pivot arm is pivotally attached to the vertical arm via a shaft mounted through two shaft holes of the pivot arm and one corresponding hole near a distal end of the vertical arm.

16. The automatic camera-cleaning device of claim 1, wherein the electronics box includes one or more components selected from among:
    a temperature sensor;
    a self-healing fuse;
    H-bridge;
    direct current voltage reducer;
    status LED lights; and
    a light sensor.

17. A method for removing spider webs and other debris from the lens of a surveillance camera, the method comprising:
    mounting a camera-cleaning device to the surveillance camera, the camera-cleaning device including
        an electric motor,
        an electronics box having a motor control circuit for controlling the electric motor and a timing-control circuit for controlling the start time, finish time, and run time of the cleaning device,
        a vertical arm mounted to the electronics box,
        a freely rotating L-shaped hinge that is pivotally attached to the vertical arm and enables the cleaning device to transition between a cleaning position and a rest position outside of the field of view of the camera, and a rotatable cleaning unit having a cleaning head and a propeller blade; and controlling the electric motor to drive the cleaning unit so that the propeller blade spins to lift the unit up to the cleaning position.

18. The method of claim 17, wherein the cleaning head has a truncated-cone shape and covered with a cleaning pad.

19. The method of claim 18, wherein the cleaning head cleans itself by spinning dirt, moisture, and debris from the cleaning pad before the pad comes into contact with the lens.

20. The method of claim 17, wherein the propeller blade spins at one of:

a single rotational velocity; and
two or more rotational velocities.

* * * * *